April 18, 1933.   E. R. HENTSCHEL   1,904,771
CONSTANT FREQUENCY CONTROL APPARATUS
Filed May 23, 1930   2 Sheets-Sheet 1
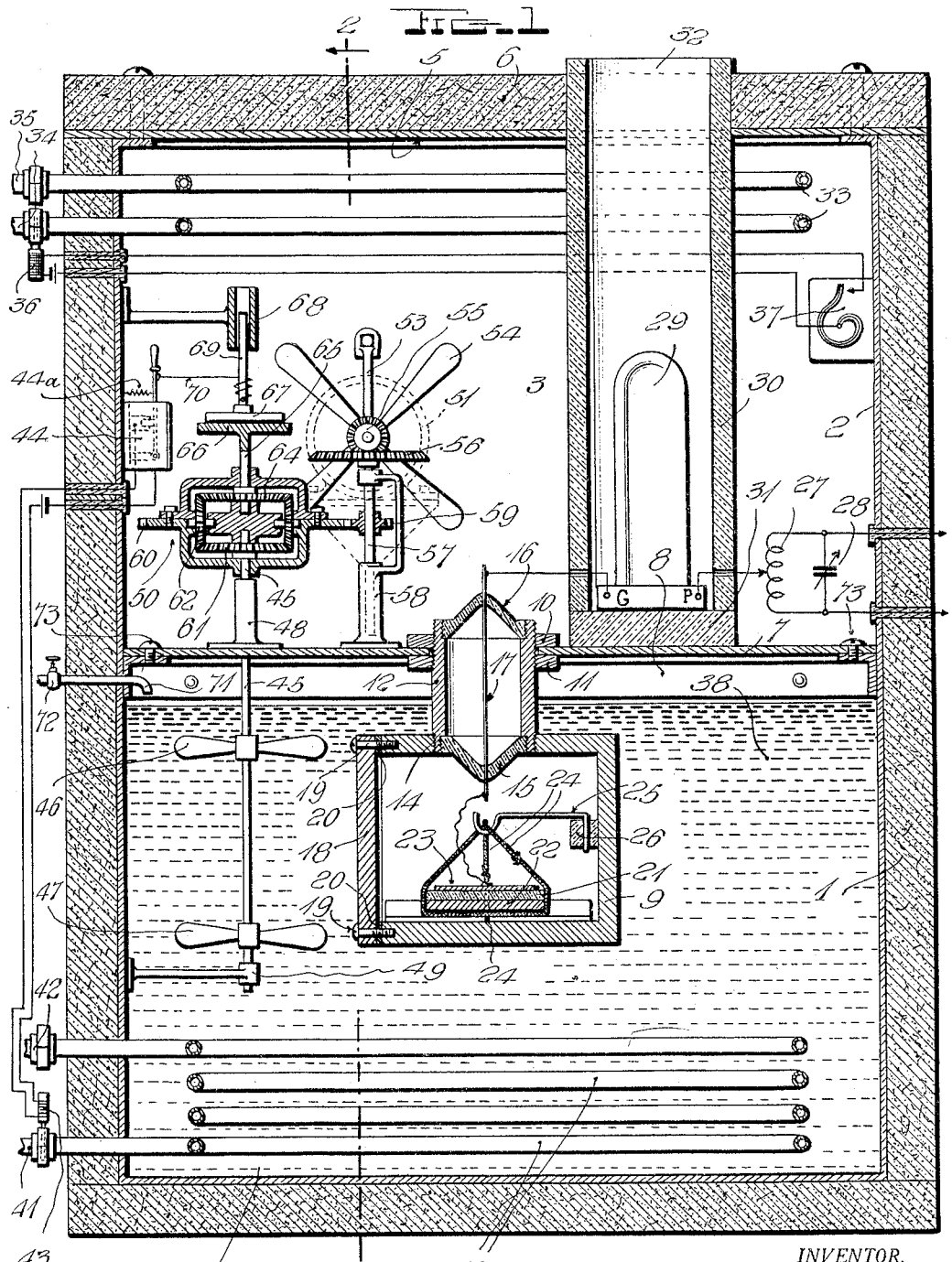
INVENTOR.
Ernest R. Hentschel,
BY Harold Dodd
ATTORNEY

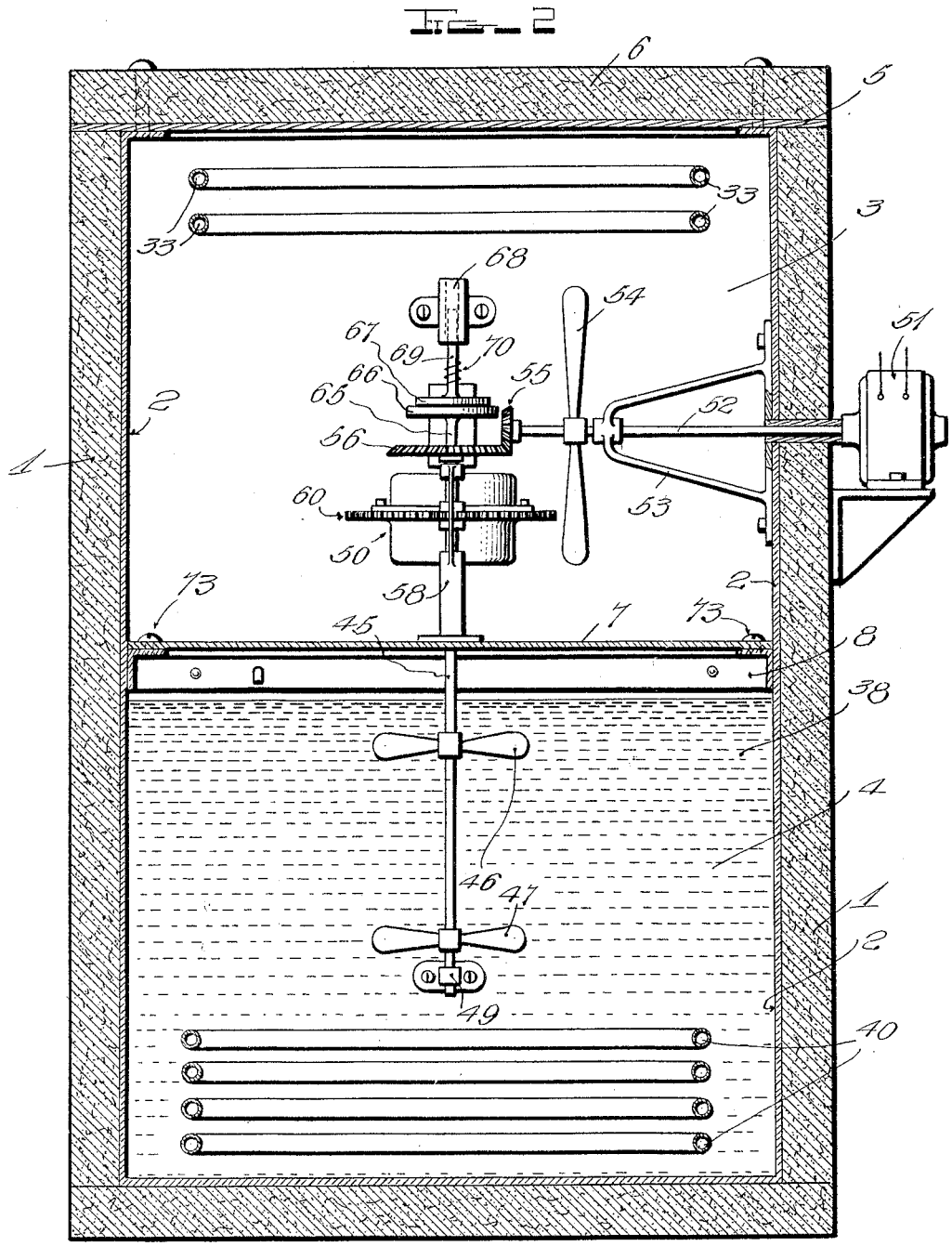

Patented Apr. 18, 1933

1,904,771

UNITED STATES PATENT OFFICE

ERNEST R. HENTSCHEL, OF WASHINGTON, DISTRICT OF COLUMBIA; JOHN OLSON, ADMINISTRATOR OF SAID ERNEST R. HENTSCHEL, DECEASED, ASSIGNOR TO WIRED RADIO, INC., OF NEW YORK, N. Y., A CORPORATION OF DELAWARE

CONSTANT FREQUENCY CONTROL APPARATUS

Application filed May 23, 1930. Serial No. 455,131.

My invention relates broadly to frequency control apparatus and more particularly to a system for maintaining a frequency determining element and associated circuits at a predetermined temperature.

One of the objects of my invention is to provide a construction of temperature control apparatus for frequency determining elements wherein an extremely constant temperature is secured for maintaining the operating condition of the frequency determining element at a precise frequency.

Another object of my invention is to provide a construction of temperature control chamber for a frequency determining element in which a low temperature of extreme constancy is secured.

Other and further objects of my invention reside in the construction of frequency fixing apparatus as set forth more fully in the specification hereinafter following by reference to the accompanying drawings, in which:

Figure 1 is a longitudinal cross-sectional view taken through the temperature control apparatus and frequency control element therein; and Fig. 2 is a longitudinal cross-sectional view through the frequency control apparatus of Fig. 1 on line 2—2 thereof.

A frequency fixing device such as a piezo electric crystal, a magnetostriction oscillator or mechanically vibratile element operates at a precision frequency of fixed value when the operating temperature is maintained constant. I have applied the latent heat of fusion method to a frequency control apparatus. It is known that in a mixture of ice and water, there can be no change in temperature if the pressure is not varied, until either (1) the water has frozen, or (2) the ice has melted. This is because of the fact that heat is liberated in the change from the liquid to the solid state, even though both liquid and solid are at the same temperature. Vice versa, in the change from solid to liquid, heat is absorbed with no change in temperature. Therefore any variations in the rate of adding to or removing heat from the mixture are absorbed in physical changes in the mixture, with absolutely no change in the temperature. The effects of changes in barometric pressure (air pressure) are negligible as shown in the following table:

| Pressure kg. per sc. cm. | Temperature degrees C. |
|---|---|
| 1.033 | .00025 |
| 1.00033 | .0000025 |

Ordinary changes in air pressure are of the order of .01 inch of mercury. This is equivalent to a change of .00033 kilogram per square centimeter, and this changes the melting point of ice by .0000125 of a degree, centigrade.

A temperature regulation to within less than .0002° centigrade can be realized with as apparatus employing the latent heat of fusion method at atmospheric pressures and by using ice made of distilled water. By regulating the air pressure to within the limits of .01 inch of mercury, a theoretical temperature variation range of .0000025° is obtained. The explanation is that ice melts at a constant temperature for a given constant pressure.

The apparatus of my invention employs the latent heat of fusion principle in the arrangement illustrated in the drawings wherein reference character 1 designates a heat insulating covering which surrounds the metal tank 2 which is divided into separate compartments indicated at 3 and 4. The top of the container is closed by a plate 5 extending across the lining 2 of the container with a heat insulating cover 6 secured thereon. The partition plate 7 extends laterally across the container and is supported by the bracket 8 extending around the lining 2. The partition 7 provides a support for a central casing 9 which forms the housing for the frequency fixing element which is to be maintained at a predetermined constant frequency. The casing 9 is suspended centrally of the partition 7 by means of the lock nuts 10 and 11 which are screw threaded upon the upper end of the pipe member 12 which extends through the partition 7. The lower end of the pipe member 12 is screw threaded and extends into the housing 9 as indicated at 14. A pair of insulated members 15 and 16 are secured in opposite ends of the pipe member 12 and serve to center the central conductor 17 with respect to pipe member 12 and insulate the conductor from the interior walls of the pipe member 12. All joints between the ends of the pipe member, the partition 7, housing 9, and between the insulation members 15 and 16 and the ends of the pipe member 12 are sealed by a suitable sealing compound. One side of the housing 9 is open and is closed by the wall 18 which is secured by means of screws 19 which pass through gasket 20 hermetically sealing the side of the housing. The inside of both the housing 9 and the pipe member 12 may be evacuated although a predetermined amount of air must be left in the device to prevent ionization. The main consideration is the removal of all moisture from the inside before sealing. For extreme accuracy the entire apparatus is enclosed in a tank so as to be maintained at constant air pressure irrespective of barometric or external air pressure.

I have shown the housing 9 enclosing a frequency fixing device such as a piezo electric crystal but it will be understood that other forms of frequency fixing device may be enclosed within the housing. The piezo electric crystal is shown at 21 having its lower face resting in contact with the lower electrode 22. A plate member 23 forming an electrode for the opposite side of the frequency fixing device rests in contact with the upper face of the piezo electric crystal element 21. The piezo electric crystal is centered and maintained in position with respect to the electrodes by means of flexible cords 24 which are subjected to tension by means of spring device 25, supported from bracket 26 from one wall of the housing 9. Connection is established between the lower face of crystal 21 through the metallic casing 9 which connects through the lower electrode 22 to the lower face of the piezo electric crystal element 21. The connection to the electrode 23 extends through conductor 17 to the high frequency oscillator circuit. In order to maintain all parts of the oscillator system at uniform temperature I locate the parts of the oscillator circuit and electron tube which connects therewith within the upper compartment 3. The parts of the oscillator system have been illustrated diagrammatically as including inductance 27 and variable condenser 28 in association with the electron tube 29. The electron tube 29 is in itself a generator of heat and to avoid interference by the heat generated by the tube with the constant regulation of temperature within the temperature and frequency control apparatus, I provide a heat insulating chimney 30 separated at its base from the partition 7 by the heat insulation member 31. Heat generated by electron tube 29 therefore moves up and out of the frequency control apparatus by convection currents issued through the outlet 32 at the top of the stack or chimney 30. The conductors which pass through the stack 30 for completing connection with the electron tube 29 and the frequency control element and parts of the high frequency oscillator apparatus are so disposed and packed as to prevent escape of heat from the interior of stack 30 into the compartment 3.

The temperature of the upper compartment 3 is regulated by a refrigerating coil 33 having an inlet 34 and an outlet 35 for the passage of refrigerant. The flow of refrigerant through the coil 33 is controlled by solenoid valve 36 controlled by thermostat 37 located within the compartment 3 so that refrigerant is admitted to the coil 33 when the temperature of compartment 3 so requires.

A temperature slightly below that naturally obtained is chosen and the thermostat 37 set to close the valve 34 when the air has cooled down to the predetermined temperature. The lower compartment 4 is filled with a fluid such as water designated at 38 which rises to a level submerging the housing 9. A refrigerating coil 40 is submerged within the fluid 38 and is provided with an inlet 41 and an outlet 42 for the passage of refrigerant. I determine the required amount of refrigerant for admission to the refrigerating coil 40 in a highly novel manner. A solenoid operated valve 43 is provided at the inlet 41 and is remotely controlled from switch 44. Switch 44 is normally held closed by a spring 44a and when closed holds the valve 43 in the refrigeration coil inlet connection 41 open, allowing the refrigerant to pass through coil 40 and freeze the water 38, in the lower compartment 4. In order to determine the time when the valve 43 should close, I mount a rotatable shaft member 45 in a vertical position, the shaft member 45 carrying propellers 46 and 47 which are rotatable while submerged within the liquid 38. The reason for the propeller arrangement of 46 and 47, as will be more fully pointed out hereinafter, is to insure a condition where compartment 4 will always contain a mixture of water and ice to produce freezing action. Shaft 45 is journaled in vertical thrust bearing 48 carried by laterally extending partition 7 while the lower end of shaft 45 is journaled in bearing 49 secured to the side wall of the container. The shaft 45 is driven through a differential gearing which I have designated generally at 50 from the motor 51 disposed exteriorly of the compartment 3.

Motor 51 drives laterally extending shaft 52 which is journalled by means of bracket 53 which extends from one wall of the container. A fan 54 located in compartment 3 is driven by shaft 52. Shaft 52 carries bevel gear 55 which meshes with bevel gear 56 which transmits motion to the differential gearing 50. The bevel gear 56 is carried by shaft 57 which is journalled in a vertical position in the bearing support 58. Shaft 57 carries gear 59 which meshes with the main gear 60 of the differential gearing system 50. Shaft 45 which extends into the differential gear housing carries bevel gear 61 which meshes with bevel gears 62 and 63 and are in turn meshed with the upper bevel gear 64 of the planetary system. The upper bevel gear 64 is keyed by shaft 65 terminating in friction disc 66 of a friction clutch. The upper member 67 of the friction clutch carried by bearing 68 which is supported from one wall of the container. The shaft member 69 extending between the bearing 68 and the upper member 67 of the friction clutch is adapted to rotate and wind cord 70 upon the shaft 69 in one direction which results in opening of switch 44 against the action of spring 44a or to unwind cord 70 therefrom for closing switch 44 under the action of spring 44a. When the propellers 46 and 47 are free to slowly rotate under the driving action of motor 51 through the double reduction gearing, the shaft member 69 remains stationary and switch 44 is closed. However, when ice commences to form in the lower compartment 4, the propellers 46 and 47 encounter the resistance offered by the obstruction occurring from the ice and shaft 45 is prevented from rotating. Under this action the turning torque from driving motor 51 operates to produce planetary motion in the differential gearing 50 resulting in the turning of shaft 65 and the frictional grip of the friction clutch for the imparting of a turning torque to shaft 69. Cord 70 is wound upon shaft 69 and switch 44 is opened, resulting in the breaking of the electrical circuit to the solenoid 43 which allows solenoid 43 to close, cutting off the flow of refrigerant to the refrigerating coil 40. The ice formed in the lower compartment 4 then commences to melt and as soon as the propellers are free from ice obstruction, rotary motion is no longer imparted to shaft 69 and the switch 44 is closed under action of spring 44a, thereby opening the valve in the inlet 41 of the refrigerating coil and permitting the flow of refrigerant therethrough for initiating a succeeding cycle.

While I have discussed the submerging of the housing of the frequency determining element in one, it will be understood that any liquid which will freeze and which has an appreciable latent heat of fusion may be used. Solutions such as alcohol and water for the purpose of changing the operating temperature and thereby changing the frequency of operation of the frequency determining element may be used. A water supply pipe 71 under control of cock 72 is provided for the purpose of keeping sufficient water in the tank. The pressure in the compartment 4 is maintained constant so that an extremely constant temperature is maintained by making use of the principle of latent heat of fusion.

The apparatus is readily installed adjacent a radio transmitter or other installation employing high frequency constants whose frequency is to be maintained constant. The housing 9 may be removed from the container for replacement of the frequency determining element by opening the cover 5—6 of the container and removing the securing screws 73 enabling the apparatus to be withdrawn from the container after removal of such parts as may obstruct the passage of the equipment into or out of the container. Leads passing into the container are insulated by suitable bushings as it will be understood that one side of the frequency determining element is grounded to the lining 2 so that precaution must be taken by substantially insulating the leads which pass into or out of the cabinet.

While I have described my invention in one of its preferred embodiments, I desire that it be understood that modifications may be made and that no limitations upon my invention are intended other than are imposed by the scope of the appended claims.

What I claim as new and desire to secure by Letters Patent of the United States is as follows:

1. In a constant frequency control apparatus, a heat insulated chamber divided into a pair of sections, a frequency determining element mounted within one of said sections, an oscillator circuit having parts thereof disposed in another of said sections and means in said last mentioned section controllable by temperature conditions in said first mentioned section for governing the temperature in said last mentioned section around said frequency determining element.

2. In a frequency control apparatus, a heat insulated chamber, means dividing said chamber into separate sections, a frequency determining element mounted in one of said sections, an oscillator circuit disposed in the other of said sections and means in said last mentioned section governed by conditions existing in said first mentioned section for selectively fixing the temperature of the frequency determining element in said first mentioned section by the latent heat of fusion therein.

3. In a frequency control apparatus, a heat insulated chamber, means dividing said chamber into a pair of separate compartments, a frequency determining element disposed in one of said compartments, an oscillator apparatus in the other of said compartments, a casing enclosing said frequency determining element, said enclosure being submerged in liquid in said first mentioned compartment, and means in said second mentioned compartment controllable by the consistency of the liquid in said first mentioned compartment for controlling the temperature in said compartments.

4. In a frequency control apparatus, a heat insulated chamber, means dividing said chamber into separate compartments, a frequency determining element disposed in one of said compartments, an oscillator apparatus disposed in the other of said compartments, a casing for said frequency determining element said casing being submerged in fluid in said first mentioned compartment, means for cooling said fluid, and means in said second mentioned compartment controlled by the consistency of the fluid in said first mentioned compartment controlling the character of the fluid in said first mentioned compartment for fixing the temperature surrounding said frequency determining element by the latent heat of fusion of the fluid therein.

5. Frequency control apparatus comprising a heat insulated cabinet having a plurality of compartments, a hermetically sealed casing disposed in one of said compartments and submerged in fluid therein, a frequency determining element enclosed by said casing, oscillator circuits enclosed by the other of said compartments, and means in said second mentioned compartment controlled by the consistency of the fluid in said first mentioned compartment for regulating the rate of change of said fluid from a liquid to a solid state at constant pressure for fixing the operating temperature of said frequency determining element by the heat of fusion of the fluid in said first mentioned compartment.

6. In a frequency control apparatus, a cabinet structure divided into a plurality of compartments, one of said compartments containing liquid and means for changing the liquid from the liquid to the solid or the solid to the liquid state at constant pressure, a casing submerged in the liquid in said compartment, a frequency determining element positioned within said casing, oscillator apparatus in said second mentioned compartment connected with the frequency determining element in said casing and means in said second mentioned compartment controllable by the consistency of the liquid in said first mentioned compartment for regulating the rate of heat abstraction from the liquid in said first mentioned compartment and fixing by the heat of fusion thereof the temperature of said frequency determining element.

7. In a frequency control apparatus, a heat insulated cabinet structure divided into a plurality of compartments, one of said compartments being flooded with a liquid, a hermetically sealed enclosure submerged in the liquid in said compartment, an oscillator apparatus disposed in another of said compartments, means extending between said compartments for controlling the operating temperature of said frequency determining element within said enclosure comprising a mechanically driven device submerged in the liquid in said first mentioned compartment, and a circuit closing device disposed in the other of said compartments for electrically controlling the change in condition in the liquid in said first mentioned compartment for governing the temperature of said frequency fixing element by the latent heat of fusion.

8. A frequency control apparatus comprising a cabinet structure divided into a pair of separate compartments, one of said compartments being flooded with liquid and having means therein for freezing the liquid, a hermetically sealed casing disposed in said compartment, a frequency fixing element mounted in said casing, oscillator circuits mounted in the other of said compartments and connected with the frequency determining element in said first mentioned compartment, a mechanical rotator submerged in the liquid in said first mentioned compartment, means extending through said second mentioned compartment for driving said mechanical rotator, and electrical means governed by the obstruction offered to the movement of said mechanical rotator through the liquid in said first mentioned compartment for regulating the rate of change between the solid and liquid state within said first mentioned compartment for governing the temperature of said frequency determining element by the heat of fusion.

9. A frequency control apparatus comprising a cabinet structure divided into a pair of compartments, a hermetically sealed enclosure disposed in one of said compartments, a frequency determining element positioned within said enclosure, an oscillator apparatus disposed in the other of said compartments, connections between said oscillator apparatus and said frequency determining element, said enclosure being submerged in liquid in said first mentioned compartment, a refrigerating coil disposed in said compartment, a mechanical rotator submerged in the liquid in said first mentioned compartment, means for driving said mechanical rotator and electrically controlled means operated according to the rate of movement of said mechanical rotator for supplying refrigerant to said refrigerating coil for correspondingly regulating the change in consistency of the liquid in said first mentioned compartment and fixing the operating temperature of said frequency control element by the latent heat of fusion.

10. In a frequency control apparatus, a heat insulated cabinet structure divided into a pair of compartments, one of said compartments being flooded with liquid, a hermetically sealed enclosure disposed therein, a frequency determining element in said enclosure, oscillator apparatus disposed in the other of said compartments and electrically connected with said frequency determining element, a refrigerating coil submerged in the fluid in said first mentioned compartment, a mechanical rotator submerged in the fluid surrounding said enclosure, drive means extending through said first mentioned compartment for imparting rotary motion to said mechanical rotator, a differential gear disposed between said drive means and said mechanical rotator, a circuit controlling device operative by the movement of said differential gear according to the rate of motion of said mechanical rotator for correspondingly controlling the supply of refrigerant to said refrigerating coil and governing the temperature of said frequency determining element by the latent heat of fusion.

11. A frequency control apparatus comprising a heat insulated cabinet, an oscillator apparatus including an electron tube having a heated cathode therein disposed within said cabinet structure, means for maintaining said oscillator apparatus at relatively low temperature and a heat insulated conduit surrounding said electron tube and extending to a position exteriorly of said cabinet structure for dissipating the heat developed by said electron tube during the operation of said oscillator apparatus.

12. In a frequency control apparatus, a heat insulated cabinet structure, an oscillator apparatus disposed within said cabinet structure, said oscillator apparatus including an electron tube having a heated cathode, means for maintaining said oscillator apparatus at relatively low temperature and means for thermally insulating said electron tube from the other parts of said oscillator apparatus within said cabinet structure.

13. A frequency control apparatus including a heat insulated cabinet structure, an oscillator apparatus including an electron tube mounted within said cabinet structure, refrigerating means for maintaining the oscillator apparatus within said cabinet structure at relatively low operating temperature and a thermally insulated stack telescopically arranged over said electron tube for conveying heat generated by said tube to a position exteriorly of said cabinet structure.

ERNEST R. HENTSCHEL.